(12) United States Patent
Felkins et al.

(10) Patent No.: US 6,220,100 B1
(45) Date of Patent: Apr. 24, 2001

(54) VIBRATION TABLE WITH UNIFORM DISTRIBUTION

(75) Inventors: Charles F. Felkins, Berthoud, CO (US); Gregory M. Gilles, Belmont, MI (US); Dwayne D. Botruff, Caledonia, MI (US); Gregory J. Langfeldt, Kentwood, MI (US)

(73) Assignee: Envirotronics, Grand Rapids, MI (US)

( * ) Notice: Subject to any disclaimer, the term of this patent is extended or adjusted under 35 U.S.C. 154(b) by 0 days.

(21) Appl. No.: 09/325,483

(22) Filed: Jun. 3, 1999

(51) Int. Cl.[7] .................................................. G01M 7/00
(52) U.S. Cl. .............................................................. 73/663
(58) Field of Search .................................................. 73/663

(56) References Cited

U.S. PATENT DOCUMENTS

| | | | |
|---|---|---|---|
| 4,181,026 | 1/1980 | Abstein, Jr. et al. | 73/665 |
| 4,181,027 | 1/1980 | Talbott, Jr. | 73/665 |
| 4,181,029 | 1/1980 | Talbott, Jr. | 73/665 |
| 4,181,208 | 1/1980 | Davis | 192/106.1 |
| 5,412,991 | 5/1995 | Hobbs | 73/663 |
| 5,517,857 | * 5/1996 | Hobbs | 73/571 |
| 5,589,637 | 12/1996 | Hobbs | 73/663 |
| 5,594,177 | 1/1997 | Hanse | 73/663 |
| 5,675,098 | 10/1997 | Hobbs | 73/835.6 |
| 5,744,724 | 4/1998 | Hobbs | 73/665 |
| 5,836,202 | 11/1998 | Hobbs | 73/665 |

* cited by examiner

Primary Examiner—Richard A. Moller
(74) Attorney, Agent, or Firm—Van Dyke, Gardner, Linn & Burkhart, LLP

(57) ABSTRACT

A vibration table includes a base, a plurality of springs, and a platform supported by the springs on the base. The platform includes spaced-apart first and second sides and at least one reinforcing member extending transversely across the second side. The first side of the platform defines a mounting or support surface for mounting articles on the vibration table. The second side includes a plurality of reinforcing members. The platform is vibrated by a plurality of vibration assemblies which are mounted to the reinforcing members whereby the reinforcing member distributes vibration from the vibration assemblies uniformly across the platform. At least one of the reinforcing members includes a mounting surface which extends generally orthogonal to the second side of the platform.

46 Claims, 14 Drawing Sheets

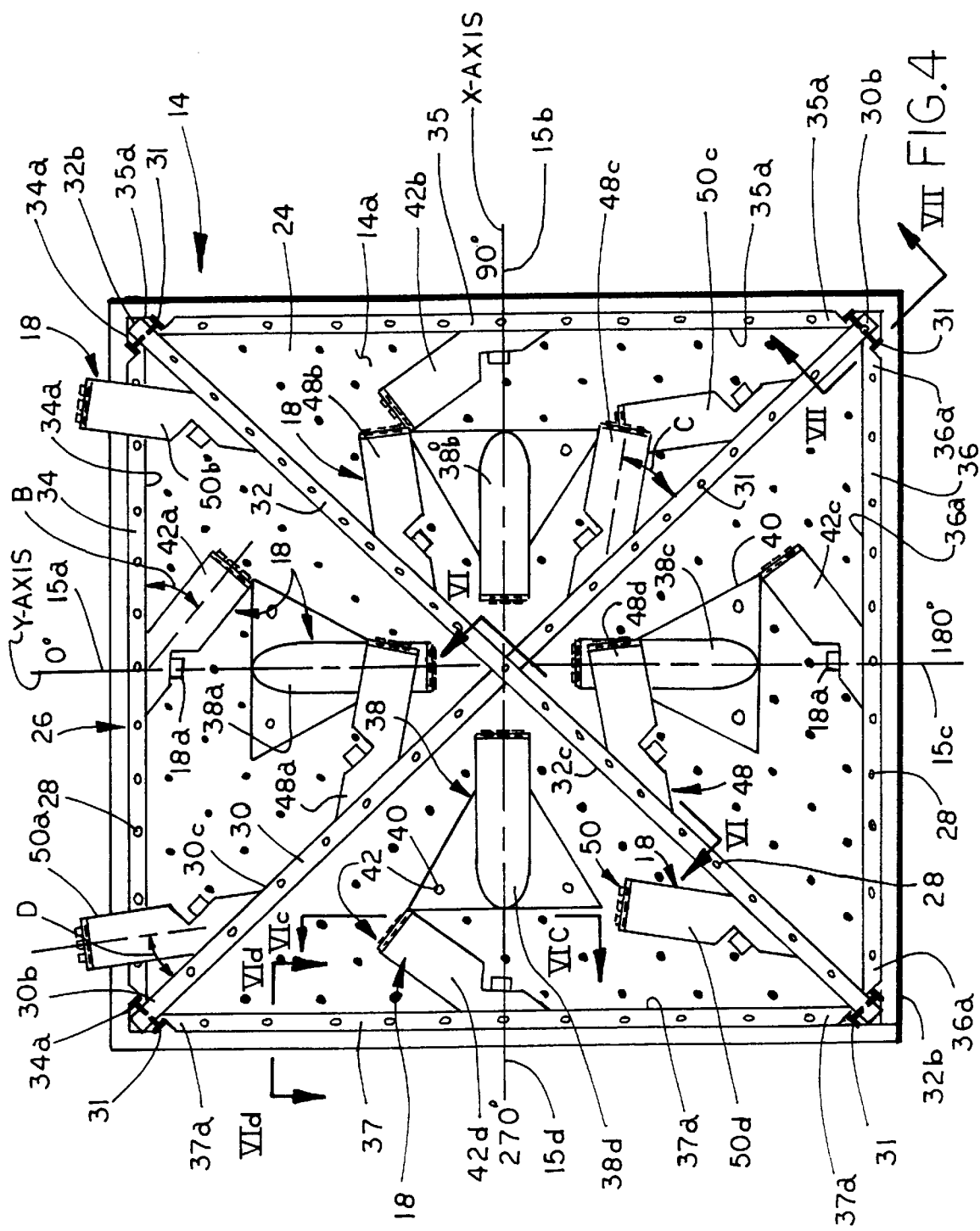

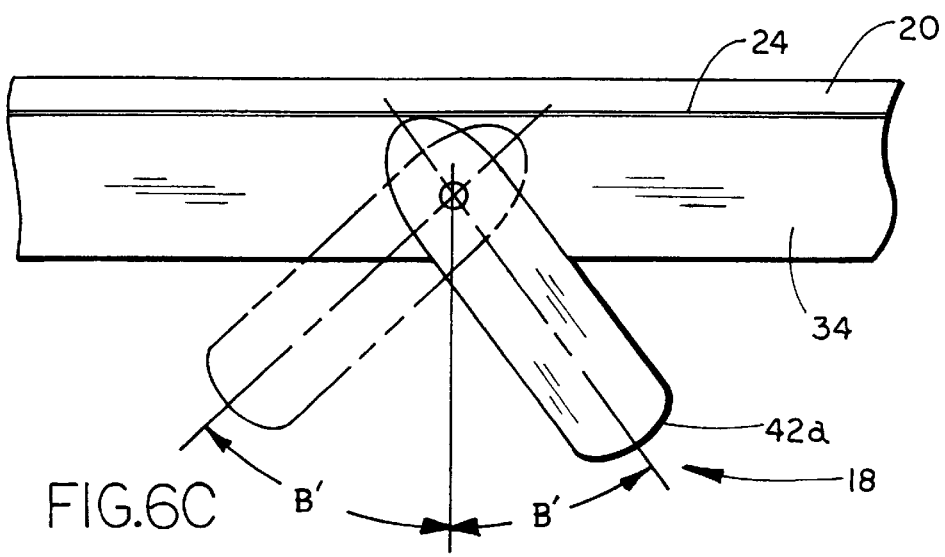
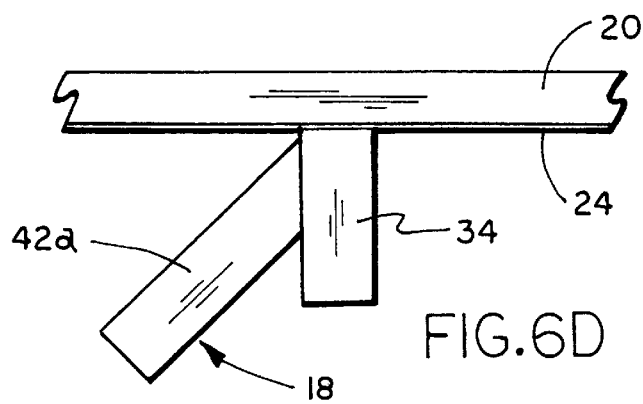
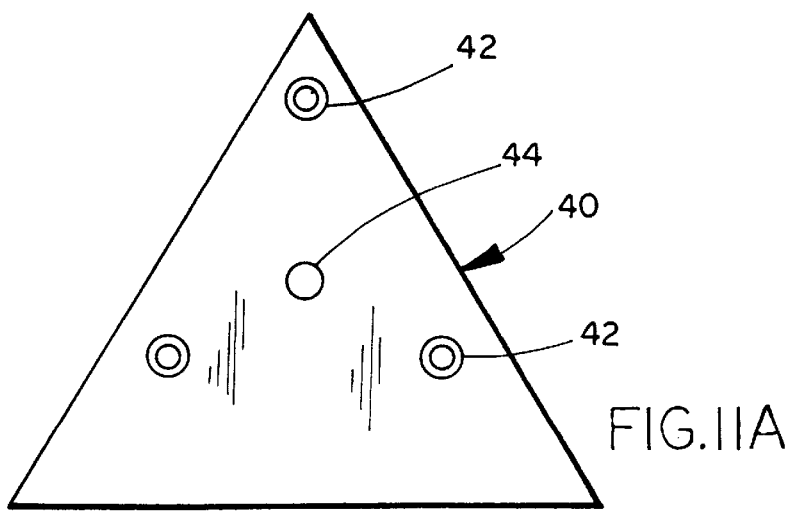
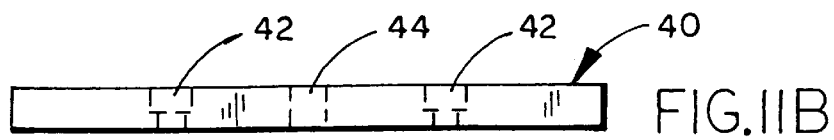

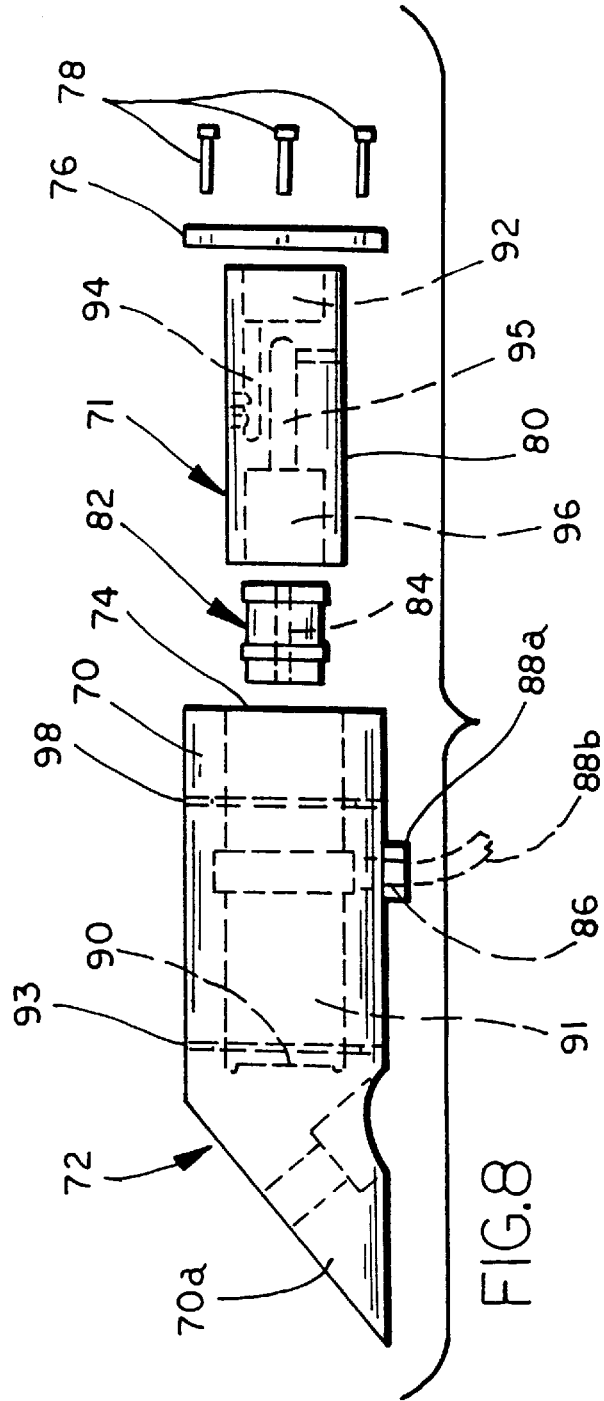
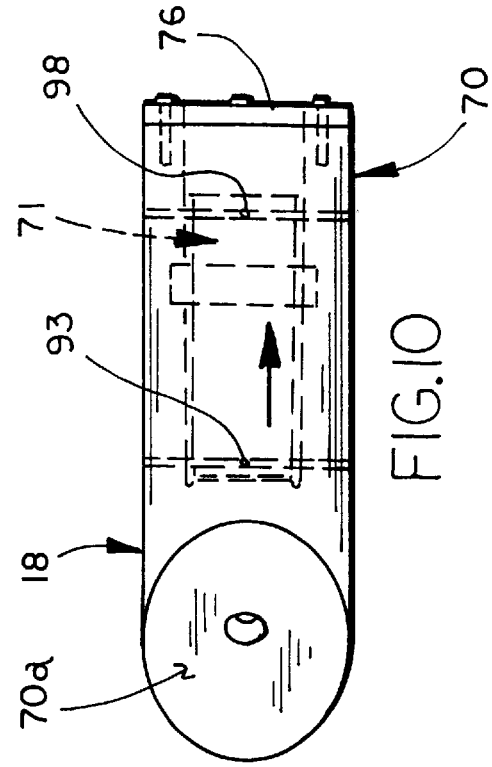
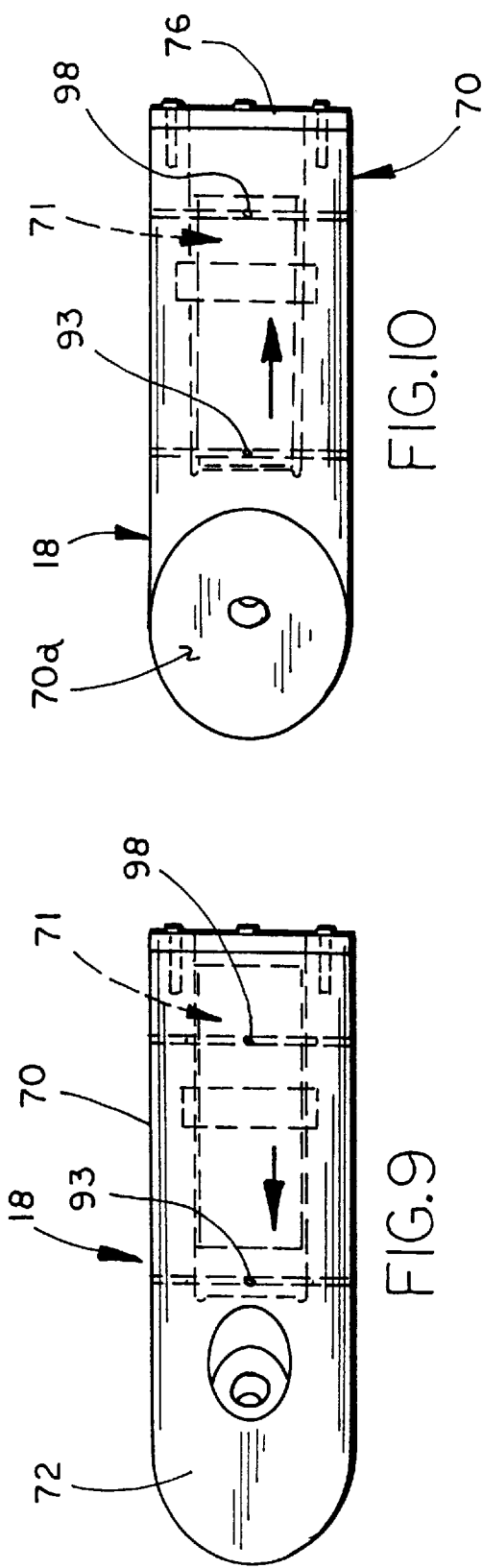

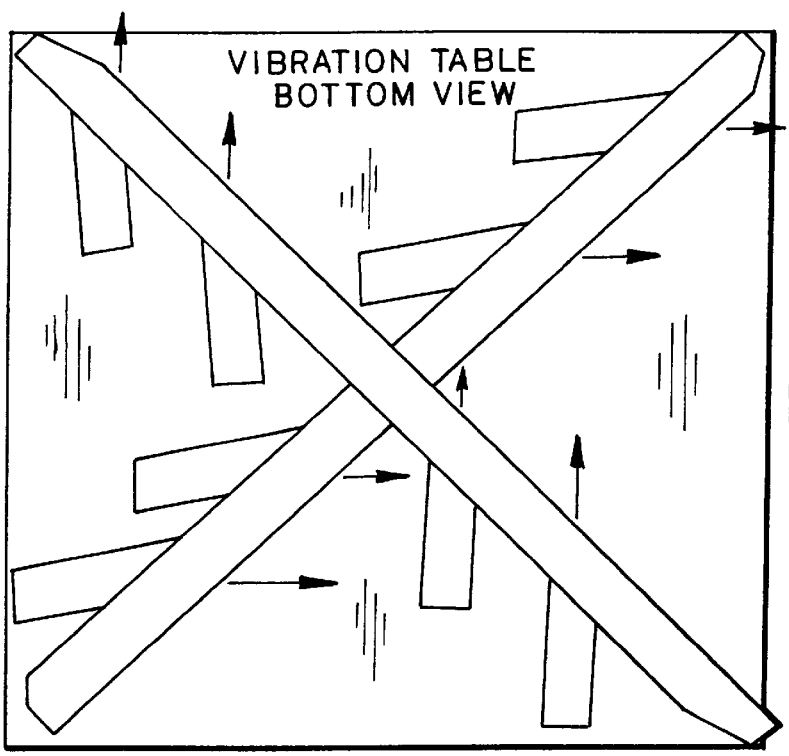
FIG.18
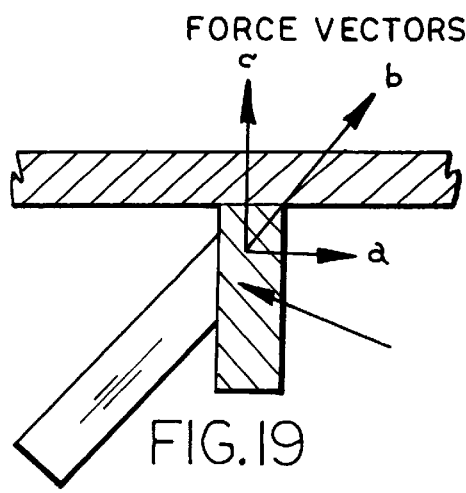
FIG.19
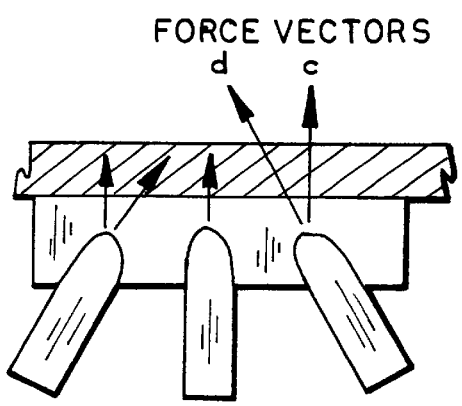
FIG.20
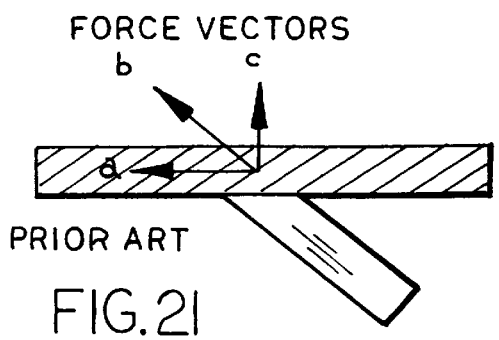
PRIOR ART
FIG.21
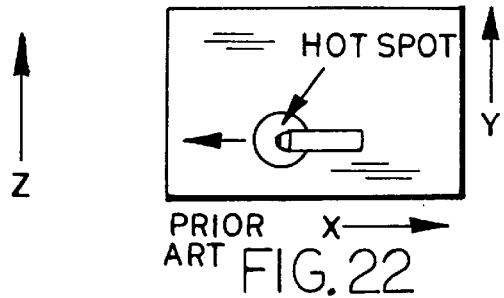
PRIOR ART FIG.22

VIBRATION TABLE WITH UNIFORM DISTRIBUTION

TECHNICAL FIELD AND BACKGROUND OF THE INVENTION

The present invention relates to a vibration table and, more particularly, to a vibration table that provides substantially uniform vibration across the table to test a plurality of devices mounted on the table for device reliability.

Shaker or vibration tables are often used in an assembly line to screen devices for any possible defects which may result or may have resulted from the manufacturing process. In this manner, products which have defects identified by the vibration table may be screened out of the production line process before being shipped to a customer. Often vibration tables are used in conjunction with a heating and cooling temperature cycling or burn in chamber so that the devices can be further screened for defects that may arise from exposure to elevated and lowered temperatures or from the combined synergism of both temperature and vibration.

Typical vibration tables include a base and a floating platform on which devices are secured or mounted for testing. The vibration table includes a plurality of vibration assemblies or "hammers", which are secured to the lower surface of the platform to induce vibration in the platform. The vibration assemblies are typically secured to the platform at angles between thirty five degrees (35°) to forty-five degrees (45°) with respect to the vertical axis to induce vibration pulses in three axes of the platform. FIGS. 21 and 22 illustrate a standard vibrator to table mounting configuration for pneumatic vibrator vibration systems, i.e., a horizontal table with vibrators attached to the horizontal plane. There are varying modifications made to this arrangement by different table manufactures in an effort to produce more desirable table acceleration characteristics, i.e. consistent acceleration levels from point to point and in all three axes (x, y, and z). For example, the vibration tables described in U.S. Pat. Nos. 4,181,026; 4,181,027; 4,181,208; and 4,181,029 each use multiple layers of honeycomb and elastomers to spread and dampen the localized vibration energy of each vibrator. U.S. Pat. Nos. 5,412,991; 5,589,637; 5,675,098; 5,744,724; and 5,836,202 disclose vibration tables which incorporate a very thick aluminum plate for rigidity with cored-out sections to reduce the weight. In U.S. Pat. No. 5,594,177, a table is disclosed which uses two thin aluminum plates separated by spaces to achieve rigidity while still reducing the table weight.

Vibration tables available from THERMOTRON include spacers mounted on top of the table for product mounting to try and isolate the product from acceleration hot spots. As illustrated in FIGS. 21 and 22 with these standard mounting techniques, there are only three primary force vectors, i.e. a, b, and c. Depending on the rotational position of the mounted vibrator, forces a and b may be imparting acceleration forces in an x direction, a y direction or any angle between the two. Although the plate is solid in most cases, and vibration energy will be distributed over the entire plate, the energy imparted by the vibrator will be greater directly over the vibrator than any other place on the plate.

Notwithstanding these various improvements, heretofore, known vibration tables do not achieve uniform vibration across the platform. As a result, one part on the platform is subjected to one set of vibration levels and another part in another section of the platform is subjected to another set of vibration levels. Consequently, multiple parts tested by a presently known vibration table may not be tested or screened at the same stress levels.

Accordingly, there is a need for a vibration table that can generate substantially uniform vibration energy across the full spectrum of the platform support surface along each of the axes in order to provide a reliable testing procedure.

SUMMARY OF THE INVENTION

According to the present invention, the vibration table includes a base and a floating platform. The floating platform is movable with respect to the base and may be supported via any method that allows the platform freedom of movement in any of the x, y, and z axes, including any rotational directions derived from the three axes. The vibration table translates the pulses generated by the attached vibrators into a multi-axially acceleration spectrum. The vibrators are attached to the table via reinforcing members that act as load spreaders and aid in force vectoring of the vibrator energy pulses.

In a preferred embodiment, the vibration table includes a top plate with a grid of multiple threaded holes for product retention, multiple reinforcing members secured to the underside of the plate with mounting holes for vibrators, and a plurality of support springs to float the platform on a base. The top plate may be of any material that can withstand the high energy impacts of the vibrators without incurring damage. The top plate may be of any physical size or configuration. Furthermore, the number of mounting holes in the mounting hole grid may be increased or decreased as desired and may assume a number of different configurations.

In the preferred configuration, the reinforcing members comprise cross-beams and perimeter beams. Additionally, the reinforcing members may include mounting brackets which are used between the cross-beams and perimeter beams. It should be understood, that other configurations of beams and mounting brackets may also be used. The reinforcing members spread the energy from the vibrators into larger areas on the top plate at lower energy levels. In addition, the reinforcing members vector the energy pulses from the vibrators into a desired horizontal axis brackets x or y. In one preferred configuration, the cross-beams cross the platform lower surface at an angle of 45°. Furthermore, the vibrators are preferably mounted in a range of 35° to 45° with respect to the mounting surfaces of the respective reinforcing members. When the vibrators mounting angles combined with the angular orientation of the cross-beams, the vibrators produce a maximum thrust to the tables x and y axes.

In further aspects, the vibrators are mounted to vertical mounting surfaces of the reinforcing members. By mounting the vibrators to the vertical mounting surfaces of the reinforcing members, the vibration assemblies may now have an adjustable vertical angle in combination with a fixed horizontal angle. This dual mounting angle imparts in effect four energy thrust vectors into the vibration table instead of the three thrust vectors associated with conventional vibration tables. This fourth force vector combined with the load spreading function of the reinforcing members, which also aid in producing more x and y axes motion, create a more even point to point energy distribution across the platform which exhibits less differences between the energy levels of each individual axes x, y, or z than previous vibration table design.

According to one form of the invention, a vibration table includes a base and a floating platform. The floating platform is movable with respect to the base and includes first and second spaced sides, with the first side for supporting articles to be vibrated by the vibration table. The platform further includes at least one projecting mounting surface which extends outwardly from the second side of the platform. The platform is vibrated by a plurality of vibration assemblies, with at least one of the vibration assemblies coupled the projecting mounting surface of the platform.

In one aspect, the platform includes at least one transverse member which extends over and is mounted to the second side of the platform in order to increase the stiffness of the platform. The transverse member includes the projecting mounting surface and may comprise, for example, a beam.

In other aspects, a first group of the vibration assemblies is mounted on the transverse member on the second side of the platform and are angled with respect to the transverse member mounting surface in a range of approximately 40° to 50° and, more preferably, at an angle of approximately 45. In further aspects, the platform further includes a plurality of projecting mounting surfaces with a second group of vibration assemblies being mounted to respective projecting mounting surfaces. The second group of vibration assemblies is preferably mounted to the projecting mounting surfaces equidistant from a center of the platform.

In yet further aspects, the vibration table includes a third group of vibration assemblies mounted to the respective projecting mounting surfaces, which are spaced, radially inward of the second group of vibration assemblies. Preferably, the third group of vibration assemblies are mounted to their respective projecting mounting surfaces approximately equidistant from the center of the platform.

In preferred form, the platform includes a plurality of reinforcing members, with each defining a projecting mounting surface. The reinforcing members may, for example, comprise perimeter members and cross-members, with the perimeter members being secured to the second side of the platform along the perimeter portion of the platform. The cross-members extend diagonally across the second side of the platform and may be interconnected with the perimeter members to thereby form a reinforcing member to stiffen the platform. In this manner, the platform has an increased stiffness and effectively transfers vibration from the various vibration assemblies across the full width and length of the platform such that the vibration levels in the platform are within a standard deviation of less than 2.

According to another form of the invention, a vibration table includes a base, a plurality of springs, and a platform which is supported by the springs on the base. The platform includes a plurality of reinforcing members which are secured to one side of the platform, with the opposed side of the platform defining a mounting surface for mounting articles to the vibration table. The vibration table further includes a plurality of vibration assemblies mounted to the reinforcing member for vibrating the platform, whereby the reinforcing members distribute vibration from the vibration assemblies uniformly across the platform.

In one aspect, the platform includes a plate and a sheet of insulation. The plate includes a plurality of mounting openings extending into a first side of the plate, which are configured to receive fasteners for securing articles to the plate. The reinforcing members are mounted to a second side of the plate through the sheet of insulation.

In another aspect, the reinforcing members comprise a plurality of beams. A first group of the beams is secured to the platform along a perimeter portion of the platform, and a second group of the beams extends diagonally across the second side of the platform. In further aspects, the beams of the first group are interconnected with the beams of the second group to form a reinforcing frame.

Other purposes and advantages of the present invention will become apparent from a study of the following portion of the specification claims and attached drawings.

BRIEF DESCRIPTION OF THE DRAWINGS

FIG. 4 is a bottom plan view of the platform of FIG. 3;

FIG. 6C is a partial cross-section view taken along line VIC—VIC of FIG. 4;

FIG. 6D is a partial cross-section view taken along line VID—VID of FIG. 4;

FIG. 8 is an exploded view of a vibration assembly of the vibration table of FIG. 1;

FIG. 9 is a top plan view of the vibration assembly of FIG. 8;

FIG. 10 is a bottom plan view of the vibration assembly of FIG. 8;

FIG. 11A is a plan view of the mounting bracket for the vibration assembly of FIG. 8;

FIG. 11B is a side view of the mounting bracket of FIG. 11A;

FIGS. 18–20 are schematic representations of the force vectors generated by the vibration assemblies of the present invention; and FIGS. 21 and 22 illustrate prior art vibration table arrangements.

DESCRIPTION OF THE PREFERRED EMBODIMENTS

Figure 1:
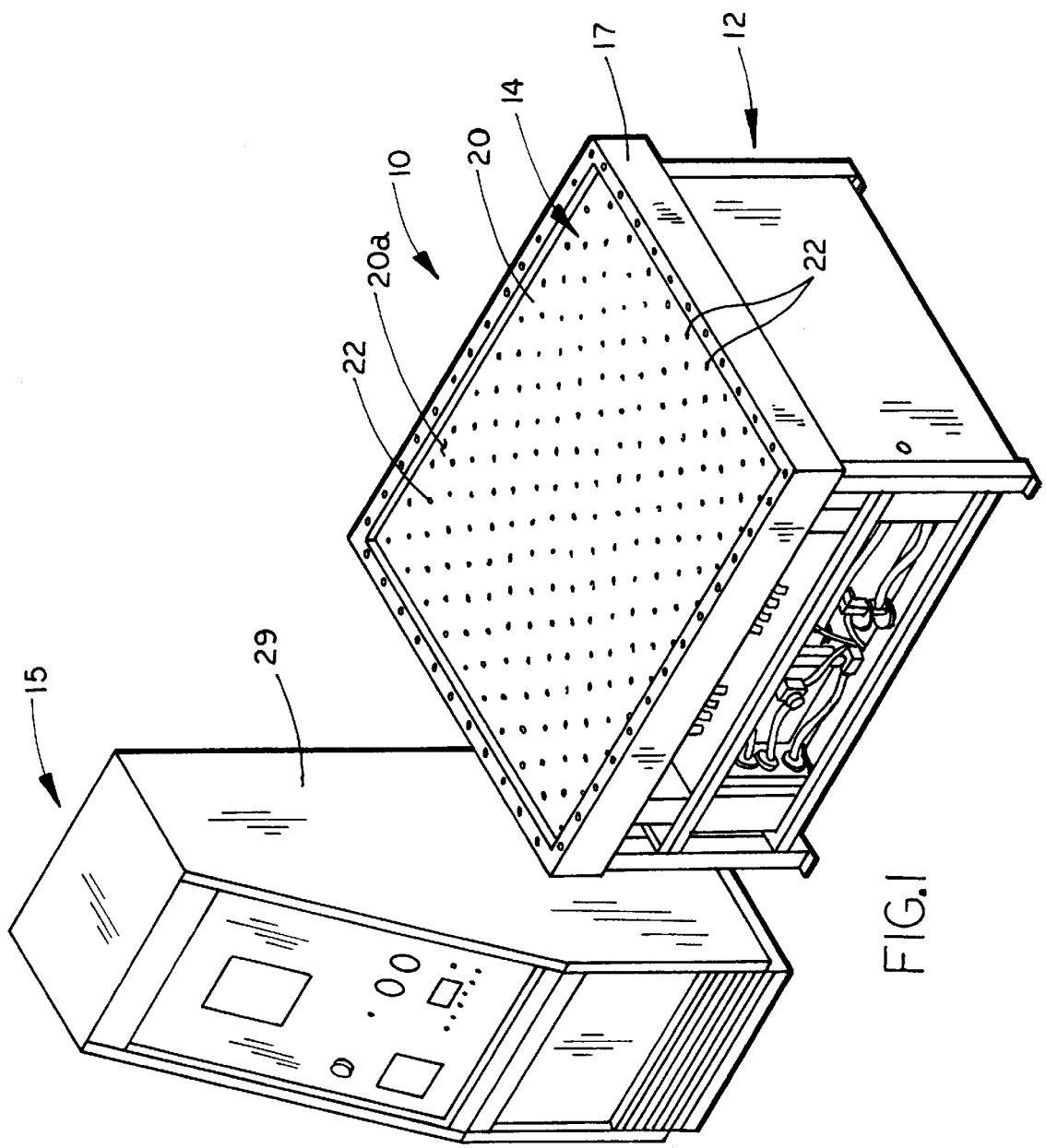
FIG. 1 is a perspective view of the vibration table of the present invention.

Referring to FIG. 1, the numeral 10 generally designates a vibration table of the present invention which can be used for testing devices, for example, mechanical or electronic devices or the like. Vibration table 10 includes a base 12 and a floating table or platform 14. In the illustrated embodiment, platform 14 is mounted to base 12 on a plurality of springs 16 (FIG. 2), which permit platform 14 to move independently of base 12. It should be understood that platform 14 may be supported on base 12 by any method that permits the platform to have freedom of movement in any of the three axes, x, y, or z.

Figure 2:
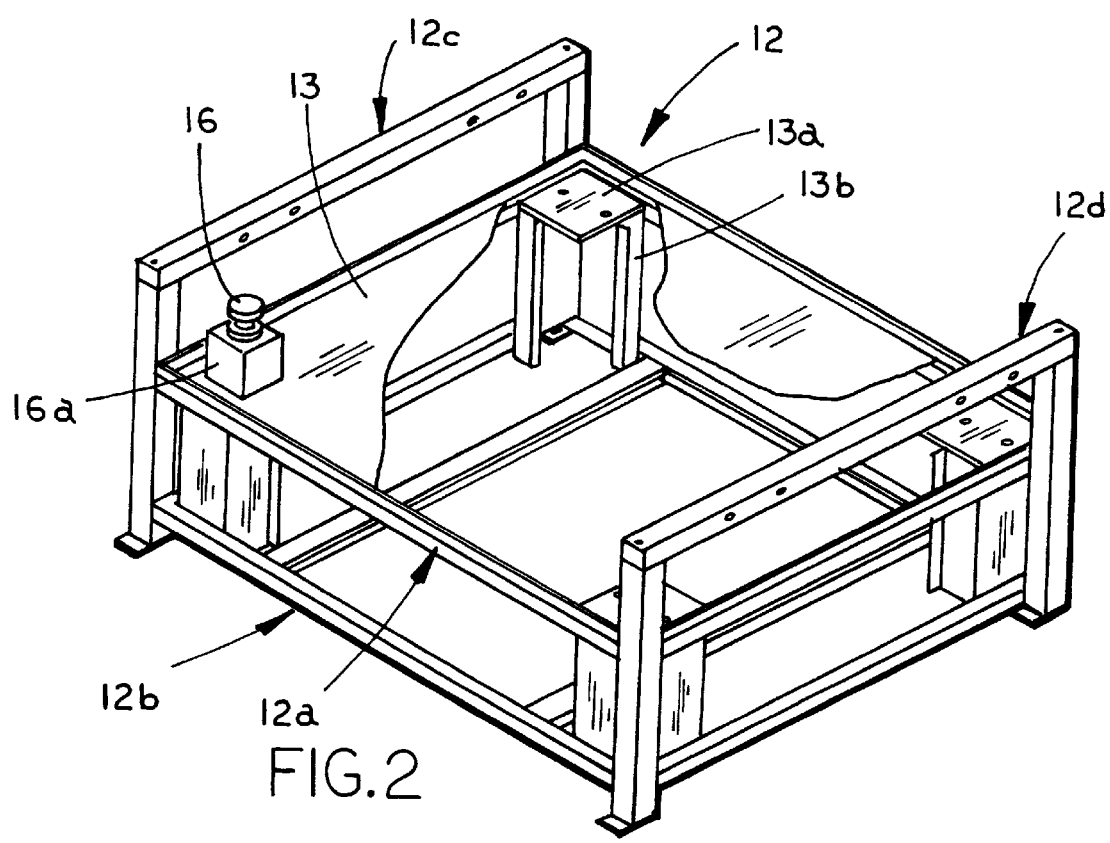
FIG. 2 is a perspective view of the base frame of the vibration table of FIG. 1.

As best seen in FIG. 2, base 12 includes a plurality of interconnecting members which form middle and lower frames 12a and 12b and side frame 12c and 12d. Frames 12a and 12b are supported by and between side frames 12c and 12d. Middle frame 12a supports a drip pan 13, which extends across frame 12a and under platform 14 to catch liquids such as condensate, or that may leak from devices undergoing testing. Springs 16 are supported by base 12 on drip pan 13 and are housed in spring standoffs 16a which permit height adjustment of platform 14. Spring standoffs 16a are located at the respective corners of drip pan 13 and middle frame 12a. Preferably, middle frame 12a is reinforced by plates 13a, which are welded between the adjoining interconnecting frame members, which form middle frame 12a, and to inner legs 13b, which extend between middle frame 12a and lower frame 12b. Inner legs 13b are similarly preferably welded to the respective interconnecting members that form frames 12a and 12b. Optionally, base 12 may include perimeter frame members 17 (FIG. 1) supported on side frame 12c and 12d, which extend around and are spaced from platform 14. In this manner, frame members 17 provide a safety barrier when platform 14 is being vibrated and a thermal seal for use in a test chamber.

Figure 3:
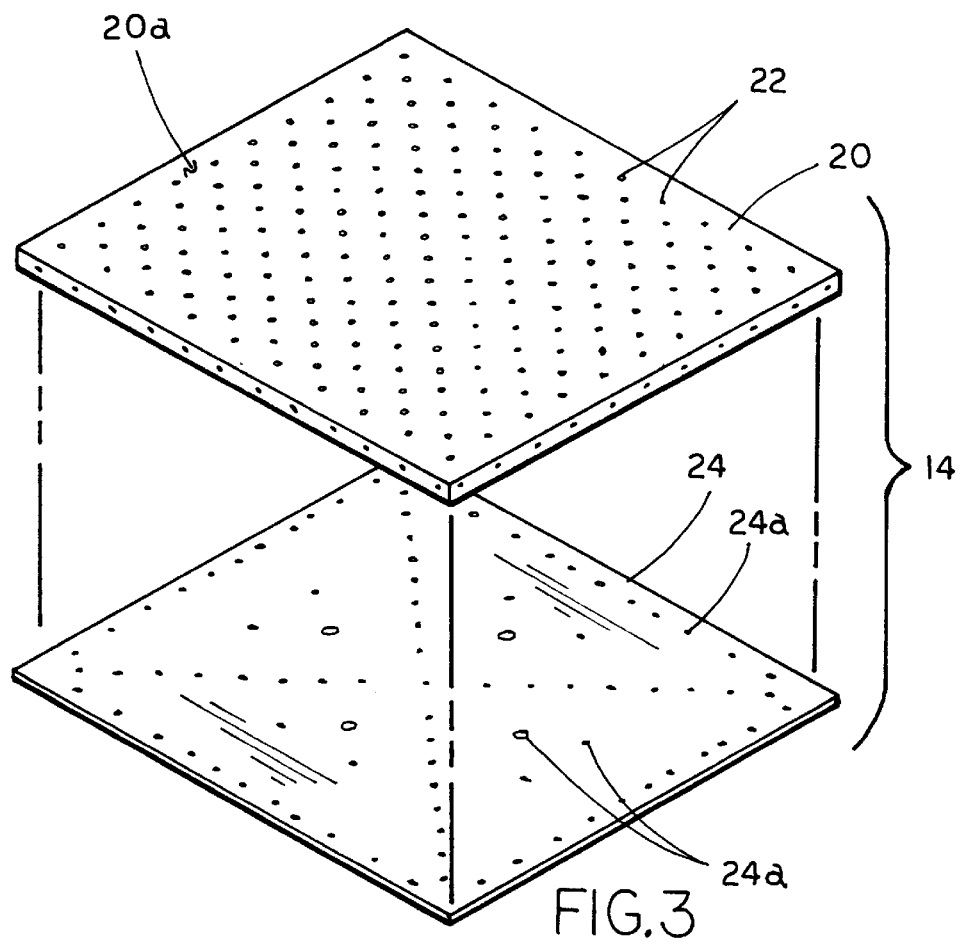
FIG. 3 is an exploded perspective view of the platform of the vibration table of FIG. 1.
Figure 3A:
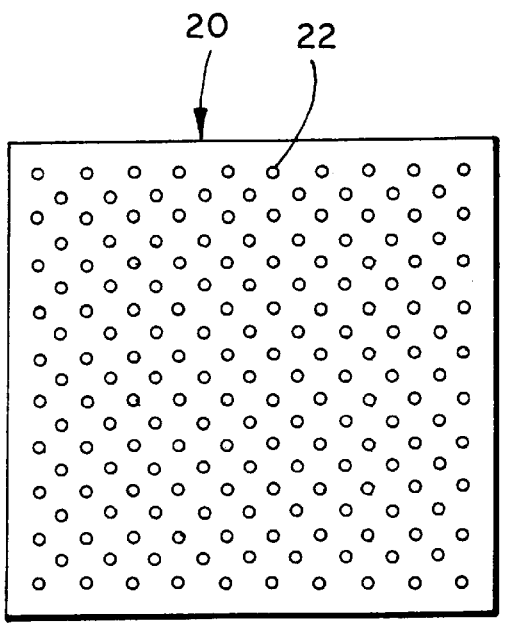
FIG. 3A is a top plan view of a mounting plate of the platform of FIG. 3.

As best seen in FIG. 3, platform 14 includes an upper plate member 20 and an optional insulation sheet 24. Plate member 20 preferably comprises a metal plate, such as aluminum, and includes a plurality of mounting openings 22 (FIGS. 1 and 3, 3A) which are arranged in a grid pattern and extend into plate member 20 from an upper surface or side 20a of plate member 20. Openings 22 are configured to receive fasteners so that devices or parts can be rigidly mounted to the upper side of platform 14 for vibration testing. In preferred form, openings 22 do not extend through plate 20. It should be understood that plate 20 may be of any material that can withstand high-energy impact without incurring damage. In addition, plate 20 may be of practically any shape or size and, further, may have a wide variety of mounting opening patterns.

Figure 3B:
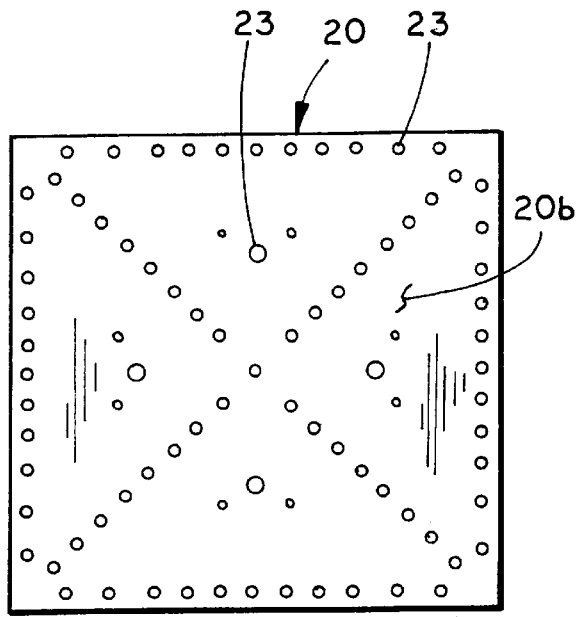
FIG. 3B is a bottom plan view of the mounting plate of FIG. 3A.

Plate member 20 further includes a second plurality of openings 23 (FIG. 3B) which extend through plate member 20 from a lower surface or side 20b of plate member 20. Openings 23 provide mounting openings and are configured to receive fasteners which attach transverse reinforcing members to plate 20, which will be more fully described below. Both sets of openings 22 and 23 are preferably threaded openings. In the illustrated embodiment, plate member 20 is square but it should be understood that plate members 20 may comprise other shapes.

Insulation sheet 24 preferably comprises a fiberglass sheet of insulation and includes a plurality of openings 24a which align with openings 23 of plate member 20 to permit transverse reinforcing members 26 to be directly mounted to plate 20. If the vibration table is used in a heating and cooling chamber, insulation sheet 24 reduces the temperature gradient through plate 20 so that the devices mounted to plate 20 can be shielded from ambient temperatures and the vibrators can be thermally isolated from chamber temperature extremes.

Referring to FIG. 4, mounted to the reinforcing members 26 are a plurality of vibration assemblies 18, which vibrate platform 14 and induce substantially uniform vibration across platform 14 in both x, y and z axes. As will be more fully described below, vibration table 10 translates the attached vibration assembly pulses into multi-axial acceleration spectrum from approximately 20 Hz to 3,000 Hz, for example. Vibration assemblies 18 are preferably pneumatic vibration assemblies and are actuated by a control system 15, which may be located in a remote control housing or console 29. Further description of control system 15 is provided in reference to the operation of the vibration table below.

Figure 6:
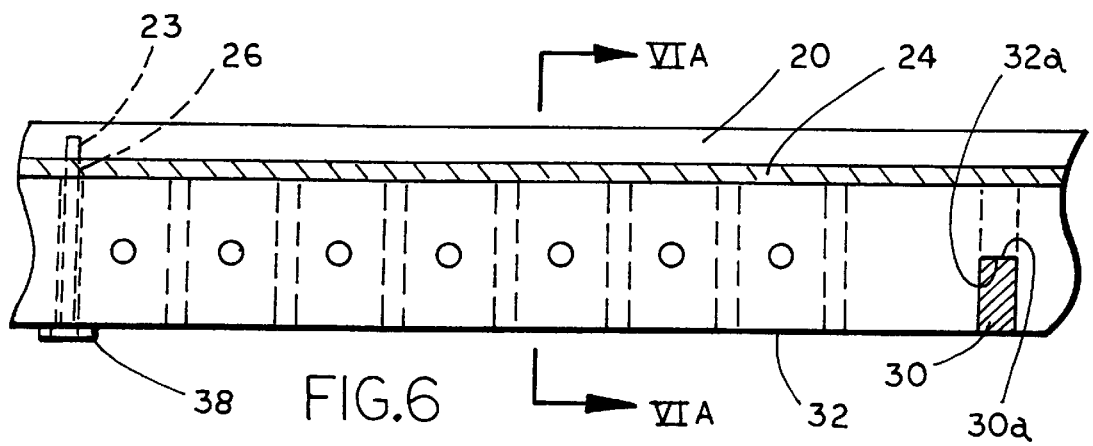
FIG. 6 is a cross-section view taken along line VI—VI of FIG. 4.
Figure 7:
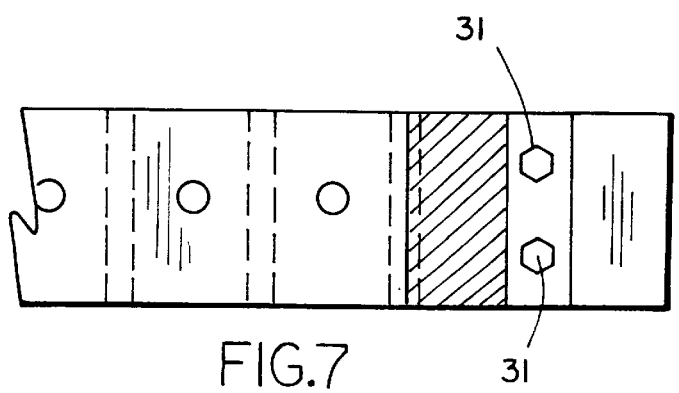
FIG. 7 is a partial cross-section elevation taken along line VII—VII of FIG. 4.
Figure 6A:
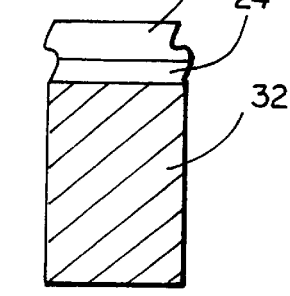
FIG. 6A is cross-section view taken along line VIA—VIA of FIG. 6.
Figure 6B:
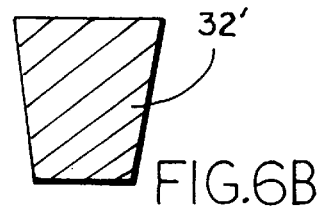
FIG. 6B is a similar view to FIG. 6A of another embodiment of the cross-member.

As noted above, platform 14 includes a stiffening system such as the plurality of transverse reinforcing members 26. Reinforcing members 26 increase the stiffness of plate 20 and further provide horizontal and vertically oriented mounting surfaces for mounting vibration assemblies 18 at varied locations across platform 14. In this manner, reinforcing members 26 act as load spreaders and aid in force vectoring of the vibration assemblies' energy pulses. Reinforcing members 26 are respectively mounted directly to plate 20 through insulation sheet 24, for example, by a plurality of mounting bolts 28. In preferred form, reinforcing members 26 include a pair of cross-members or cross-beams 30 and 32, perimeter rail members or beams 34, 35, 36, and 37, and mounting brackets 40. Cross-members 30 and 32 extend diagonally across plate 20 from opposed corners of plate member 20 to stiffen plate member 20. In the illustrated embodiment, cross-members 30 and 32 are orthogonal and mounted at approximately 45 degrees with respect to the x and y axes of platform 14. In the illustrated embodiment, cross-members 30 and 32 have a rectangular cross-section (FIG. 6A) and include at their respective medial portions notched portions 30a and 32a (FIG. 6) to permit cross-members 30 and 32 to interlock by the aligning the two notched portions 30a and 32a. It should be understood that cross-members 30 and 32, as well as rail members 34–37, may have different cross-sections, including for example a trapezoidal cross-section (shown in FIG. 6B for cross-member 32') or tubular cross-sections, including other structural shapes, or the like. In addition, cross-members 30 and 32 may be interconnected at their respective distal ends 30b and 32b by rail members 34, 35, 36, and 37. In the illustrated embodiment, rail members 34, 35, 36, and 37 are respectively secured at their distal ends 34a, 35a, 36a, and 37a to the distal ends of the cross-members 30 and 32 by fasteners 31. In this manner, cross-members and rail members 30, 32, 34, 35, 36, and 37 form a reinforcing frame. As a result, when cross-members and rail members 30, 32, 34, 35, 36, and 37 are secured to platform 14, platform 14 has a substantially uniform stiffness across its width and length and, further, includes a plurality of generally vertically oriented mounting surfaces to which vibration assemblies 18 may be mounted. Similar to cross-members 30 and 32, in the illustrated embodiment rail members 34–37 have a rectangular cross-section, but it should be understood that rail members 34–37 may also assume other shapes. In addition, it should be understood that reinforcing members 26 may include further members or beams and may be arranged in other configurations.

Figure 5:
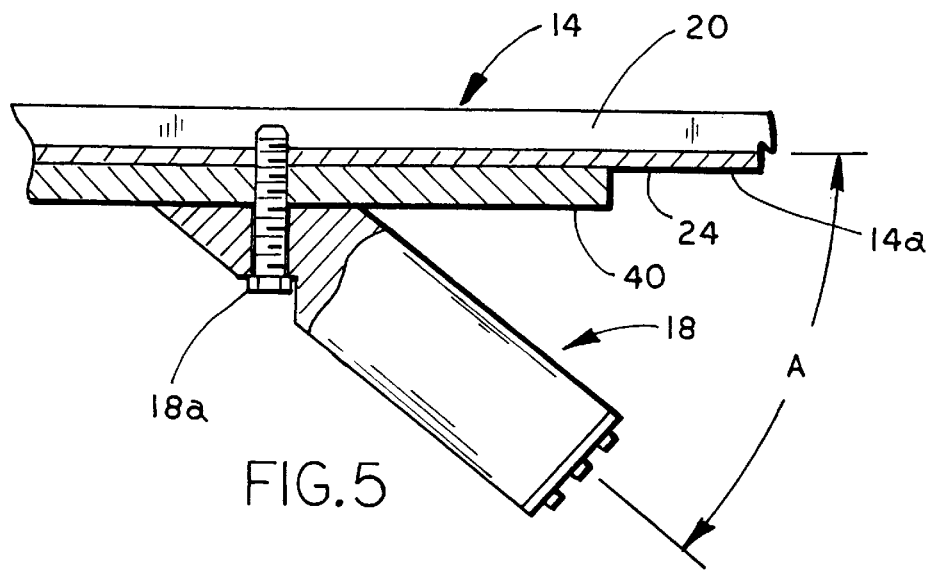
FIG. 5 is a cross-section view taken along line V—V of FIG. 4.

In the illustrated embodiment, each mounting brackets 40 comprises a triangular-shaped plate with mounting holes 42 located at each of the corners of bracket 40 for mounting bracket 40 to platform 14. Mounting brackets 40 provide spaced horizontal mounting surfaces and are mounted to plate 20 between cross-members 30, 32 and rail members 34–37. In addition, mounting brackets 40 may be arranged in a radial arrangement, which will be more fully described below in reference to the vibration assemblies. As best seen in FIG. 5, each mounting brackets 40 has a similar thickness to that of plate 20. As a result, similar to beams 30, 32, and 34–37, mounting brackets 40 locally increase the stiffness of plate 20 and, further, act as load spreaders.

To further enhance the uniformity of the vibration across platform 14, vibration assemblies 18 are mounted to reinforcing members 26 in a plurality of different orientations and mounted to a plurality of mounting surfaces, which are arranged in different planes of platform 14. In the illustrated embodiment, a first group 38 of vibration assemblies 38a, 38b, 38c, and 38d are mounted to mounting brackets 40 (FIGS. 11A and 11B). Each mounting bracket 40 includes a central mounting hole 44 through which each respective vibration assembly 38a, 38b, 38c, and 38d is mounted to platform 14. In this manner, the first group of vibration assemblies are mounted to a horizontal mounting surface of platform 14, which is spaced from plate 20 and which lies in a first plane of platform 14. Vibration assemblies 38a, 38b, 38c, and 38d and mounting brackets 40 may be mounted in a radial formation or arrangement and generally aligned along the 0°, 90°, 180°, and 270° radial axes 15a, 15b, 15c, and 15d which extend outwardly from the central portion of platform 14. In preferred form, each of the vibration assemblies 38a, 38b, 38c, and 38d is mounted at an angle A (FIG. 5) with respect to its respective mounting bracket 40 in a range of approximately 35° to 45°, and most preferably at an angle of approximately 45°. Consequently, all four vibration assemblies produce vibration vector forces in the x, y, and z axes. Furthermore, since vibrating assemblies are mounted to a surface spaced from plate 20, vibration assemblies 38a, 38b, 38c, and 39d produce a fourth vibration vector and bending force vector.

A second group 42 of vibration assemblies 42a, 42b, 42c, and 42d are mounted to perimeter rails 34, 35, 36, and 37, respectively. In preferred form, each vibration assembly 42a, 42b, 42c, and 42d is mounted to a respective vertical side surface 34a, 35a, 36a, and 37a of perimeter rails 34, 35, 36, and 37 at an angle B with respect to the x-axis and at an angle B' with respect to the z-axis. Angles B and B' are preferably in a range of about 35° to 45°, and most preferably approximately 45°. In this manner, vibration assemblies 42a, 42b, 42c, and 42d mount to four different mounting surfaces in four different planes of platform 14 and produce x, y, and z vectors forces in each of the planes and, further, produce a bending force vector. In addition, each vibration assembly 42a, 42b, 42c, and 42d is mounted to a medial portion of each respective perimeter rail 34, 35, 36, and 37 and, more preferably, mounted such their respective fasteners are mounted to perimeter rails along radial axes 15a, 15b, 15c, and 15d. In this manner, the vibration which is induced by the second group of vibration assemblies is generally uniformly distributed across plate 20 by perimeter rail members 34, 35, 36 and 37 and, further, by cross-members 30 and 32.

A third group 48 of vibration assemblies 48a, 48b, 48c, and 48d are mounted to cross-members 30 and 32, and preferably to a respective vertical side surface 30c and 32c of cross-members 30 and 32 such that vibration assemblies 48a, 48b, 48c, and 48d lie in a common plane and apply forces to a third set of mounting surfaces which lie in a third set of planes of platform 14. Vibration assemblies 48a, 48b, 48c, and 48d are similarly mounted to vertical side surfaces 30c and 32c at an angle C with respect to the longitudinal axis of cross-members 30 and 32 in a range of approximately 35° to 45°, and, most preferably, at an angle of approximately 45°. In addition, vibration assemblies 48a, 48b, 48c, and 48d are mounted to vertical mounting surfaces 30c and 32c at an angle C' with respect to the z axis preferably in a range of 35° to 45° and, more preferably at approximately 45°. As a result, vibration assemblies 48a, 48b, 48c, and 48d produce x, y, and z vector forces in each of the third set of mounting surfaces and planes. Furthermore, vibration assemblies 48a, 48b, 48c, and 48d are preferably mounted to cross-members 30 and 32 at medial portions of the respective cross-members but spaced radially outward from the center of platform 14.

A fourth group 50 of vibration assemblies 50a, 50b, 50c, and 50d are mounted to cross-members 30 and 32 radially outward from vibration assemblies 48a, 48b, 48c, and 48d and are similarly mounted to vertical side surfaces 30c and 32c of cross-members 30 and 32. Similar to vibration assemblies 48a, 48b, 48c, and 48d, vibration assemblies 50a, 50b, 50c, and 50d are mounted directly to vertical side surfaces 30c and 32c at an angle with respect to the longitudinal axes of cross-members 30 and 32 in a range of 35° to 45°, and most preferably at an angle of approximately 45° and at an angle with respect to the z-axis in a range of 35° to 45° and, most preferably, at approximately 45°. Consequently, vibration assemblies 50a, 50b, 50c, and 50d may produce x, y, and z vector forces in the same planes as vibration assemblies 48a, 48b, 48c, and 48d.

In the present invention, the vibrators are mounted on the vertical mounting surfaces of the respective reinforcing members. This configuration has multiple advantages over the previous methods. Referring to FIGS. 18–20, vibration assemblies 18 generate the same three force vectors described previously, i.e. a, b, and c. However, these force vectors are generated in the reinforcing members which are attached to the lower horizontal surface of the vibration platform. The reinforcing members act like large load spreaders distributing the energy across the platform so that the high energy "spots" are diluted in amplitude and cover a much larger area. Since the vibration assemblies attachment point is preferably several inches below the platform, which will tend to create a small pivoting action, the force vectors are made less defined and include some rotational energy. As best seen in FIG. 20, an additional force vector d is created by mounting the vibration assembly at an angle on the vertical mounting surface of the reinforcing member. By applying the acceleration forces into four vectors instead of three, the benefits derived from the reinforcing members creates a vibration platform that has much improved vibration characteristics. As a result, the platform has more consistent acceleration levels from point to point on the table. In addition, with the arrangement of vibration assemblies 18, the force vectors generated by the vibration assemblies can be more accurately balanced to achieve uniform vibration pulses in platform 14.

The standard deviations of measured energy levels on all axes are significantly less than any other table currently available. Furthermore, the platform exhibits close average vibration levels between the three axes. In addition, the platform exhibits reduced harmonics as compared to other rigid table types. Moreover, by mounting the vibrators to the vertical mounting surfaces of the reinforcing members, the vibration assemblies may now have an adjustable vertical angle in combination with a fixed horizontal angle. This dual mounting angle imparts in effect four energy thrust vectors into the vibration table instead of the three thrust vectors associated with conventional vibration tables. This fourth force vector combined with the load spreading function of the reinforcing members, which also aid in producing more x and y axes motion, create a more even point to point energy distribution across the platform which exhibits less differences between the energy levels of each individual axes x, y, or z than previous vibration table design.

Referring to FIG. 8, each vibration assembly 18 includes a piston housing 70 and a piston assembly 71 which is slidable within housing 70. Housing 70 preferably includes an angled end portion 72 which defines a skewed mounting surface 70a such that when fastener 18a extend through end portion 72 of housing 70, vibration assembly 18 is mounted at an angle with respect to the respective mounting surface of platform 14, as previously noted. Housing 70 further includes an open end 74, which is closed by a cover or end cap 76 which is secured to housing by fasteners 78. Piston assembly 71 includes a piston body 80 in which a resilient cylindrical body or "programmer" 82 is mounted. Cylindrical body 82 includes a transverse passage 84, which permits air to move through piston assembly 71, as will be more fully described below. Piston assembly 71 moves along the interior of housing 70 under the influence of pressurized air which is introduced into housing 70 through a pressure inlet port 86 which includes a fitting 88a for coupling to a hose or tubing 88b. As viewed in FIGS. 8, 9 and 10, piston assembly 71 moves to the left to impact or strike an inner surface 90 of housing 70 which imparts a force through mounting surface 70a to platform 14. As air enters housing 70 through inlet 86, air is directed into a thrust chamber 92 rearwardly of piston body 80 by a passageway 94 formed in piston body 80. The term "rearwardly" is arbitrary and used just a naming convention with "forward" or "forwardly" indicating toward the angle portion 72. As piston assembly 71 moves toward impact surface 90 of housing 70, air exhausts from a forward or second chamber 91 formed between forward end of piston assembly 71 and impact surface 90 through an exhaust port 93 formed in housing 70. When piston assembly 71 is fully extended through housing 70 and in the thrust position, air pressure inlet 86 is aligned with and directs air into a second passageway 95 formed in piston body 80. Second passageway 95 is in fluid communication with a central chamber 96 of the piston body 80, which in turn is in fluid communication with passageway 84 which extends transversely though cylindrical body 82. Therefore, pressurized air moves from inlet port 86 to passageway 95 into central chamber 96, through passageway 84 of cylindrical body 82 and into forward chamber 91. Forward chamber 91 is therefore pressurized and moves piston assembly 71 from the thrust position to a rebound position as air exhausts from thrust chamber 92 through a second outlet passageway 98 provided in housing 70. It can be understood that the movement of piston assembly 71 through housing 70 and resulting frequency of the impact force on platform 14 is increased with increasing air pressure.

Figure 12:
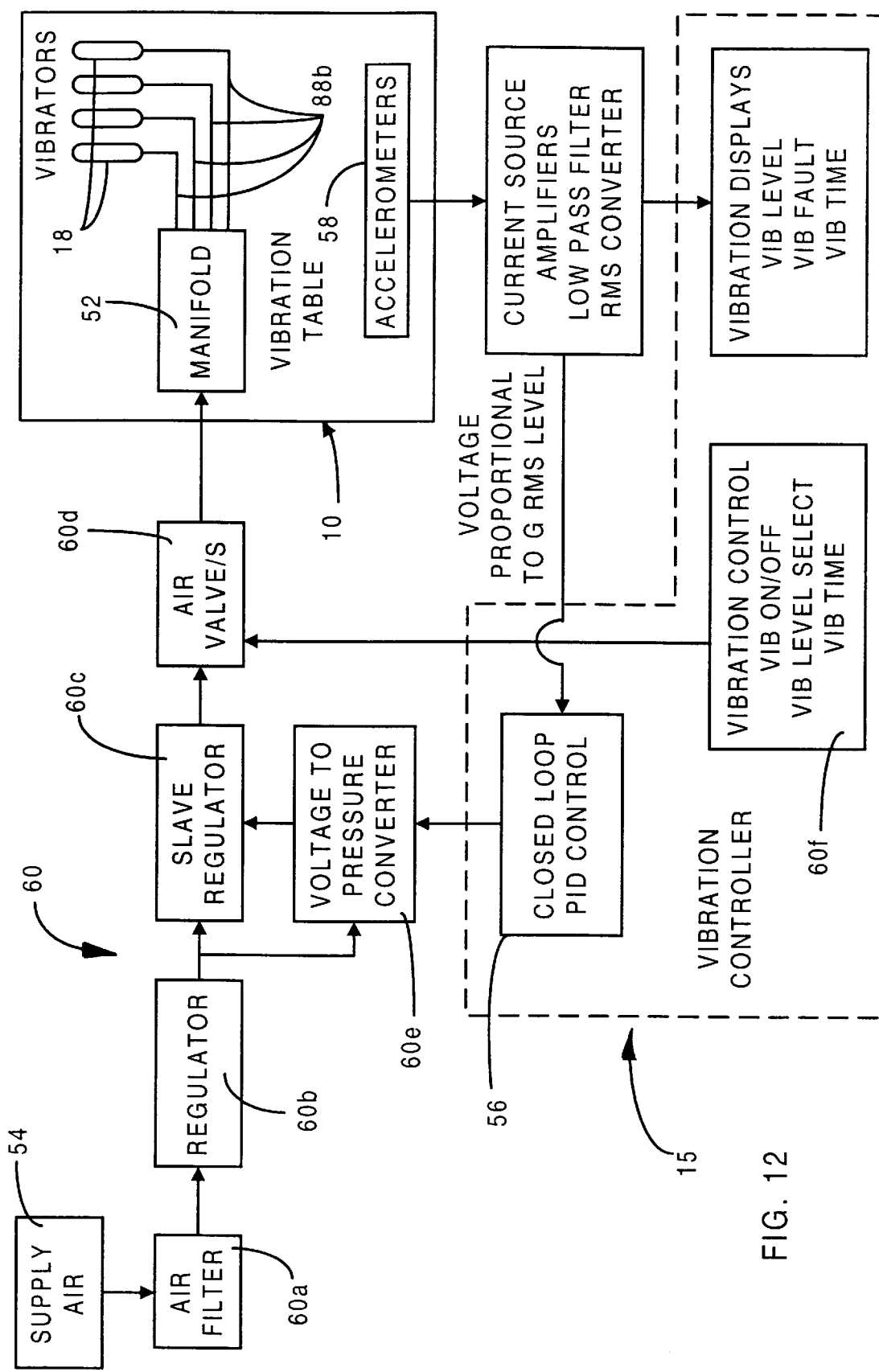
FIG. 12 is a flow diagram for the control system of the vibration table of FIG. 1.
Figure 13:
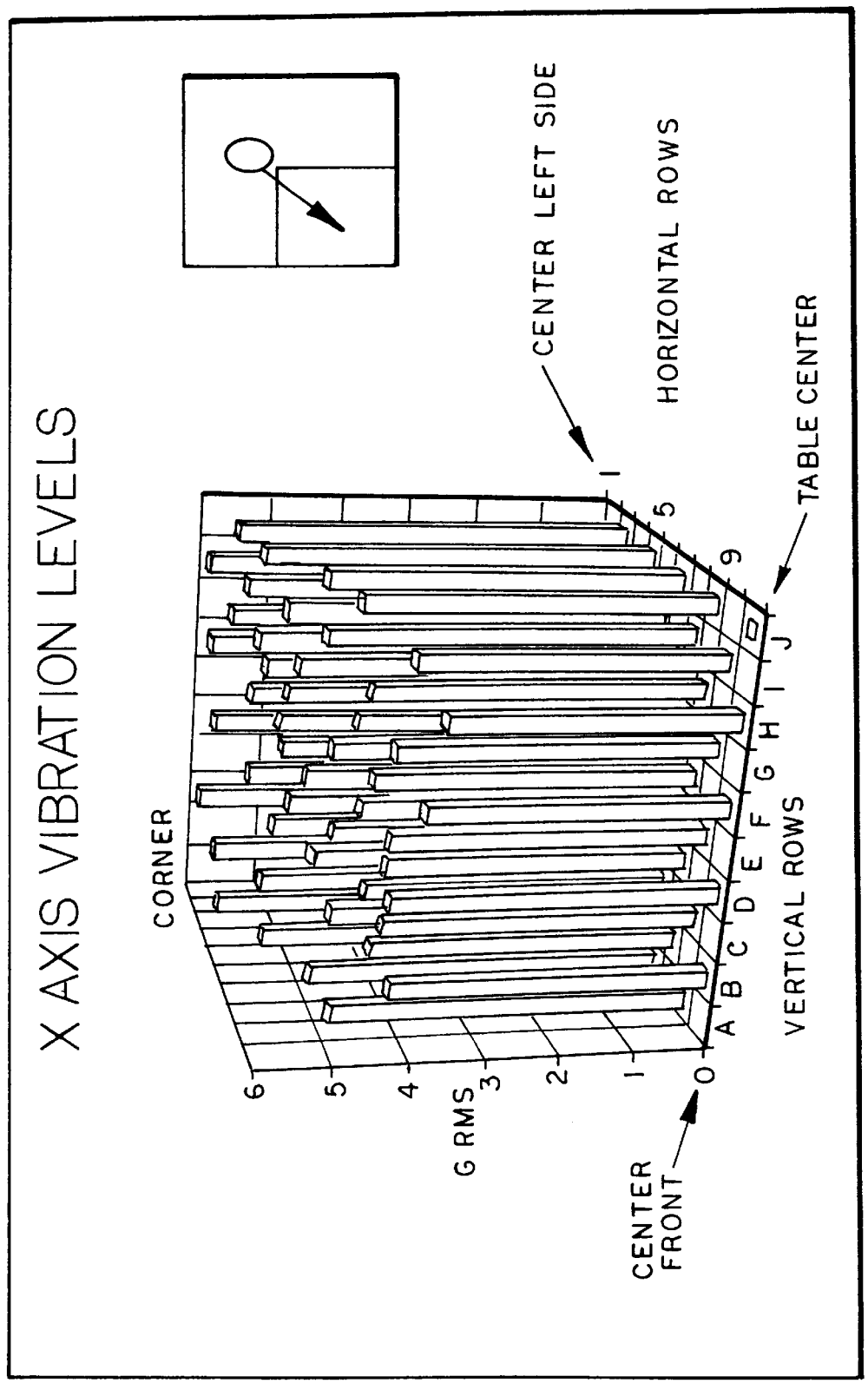
FIGS. 13–16 illustrate vibration levels across the platform of the vibration table of the present invention.

Referring to FIG. 12, vibration table 10 includes an air manifold 52, which delivers air to the respective vibration assemblies 18 through tubing 88b. Air is delivered to manifold 52 from a supply of air 54. Control system 15 includes a closed loop process or PID controller 56 that receives input from accelerometers 58, which are mounted to platform 14. Accelerometers 58 measure the G-RMS values of the platform and generate signals that are proportional to the G-RMS values. The signals generated by accelerometers 58 are forwarded to an RMS converter which generates a voltage proportional to the G-RMS levels measured by accelerometers 58. The air supplied by air supply 54 is regulated to manifold 52 by an air supply system 60 which is controlled by the closed loop controller 56. Preferably, air supply system 60 includes an air filter 60a, a regulator 60b, a slave regulator 60c which regulates the flow of air to an air valve 60d, which, in turn, delivers air to manifold 52. The pressure in slave regulator 60c is controlled by closed loop controller 56 which adjusts the air flow through air valve 60d in response to increases or decreases in the vibration on vibration table 10 as measured by accelerometers 58. As best seen in FIG. 13, closed loop controller 56 adjusts the pressure in slave regulator 60c through a voltage and pressure converter 60e. Preferably, air valve or valves 60d are coupled to vibration controls 60f, which may include, for example, on/off controls, vibration level selection controls, and vibration time controls. In this manner, control system 15 measures the vibration of vibration table 10 and includes a feedback of this measurement to compare it with the desired vibration of vibration table 10.

In this manner, when vibration assemblies 18 are actuated by control system 15, vibration assemblies 18 generate impact forces on platform 14 at frequencies that are a function of the air pressure delivered to the vibration assemblies. The impact forces are transmitted through and distributed by reinforcing members 26, resulting in substantially uniform vibration in the x, y, and z axes in plate 20. Consequently, vibration table 10 produces induce uniform vibration levels across the full width and length of platform 14 and induces uniform vibration in the respective parts which are mounted to plate 20.

Figure 14:
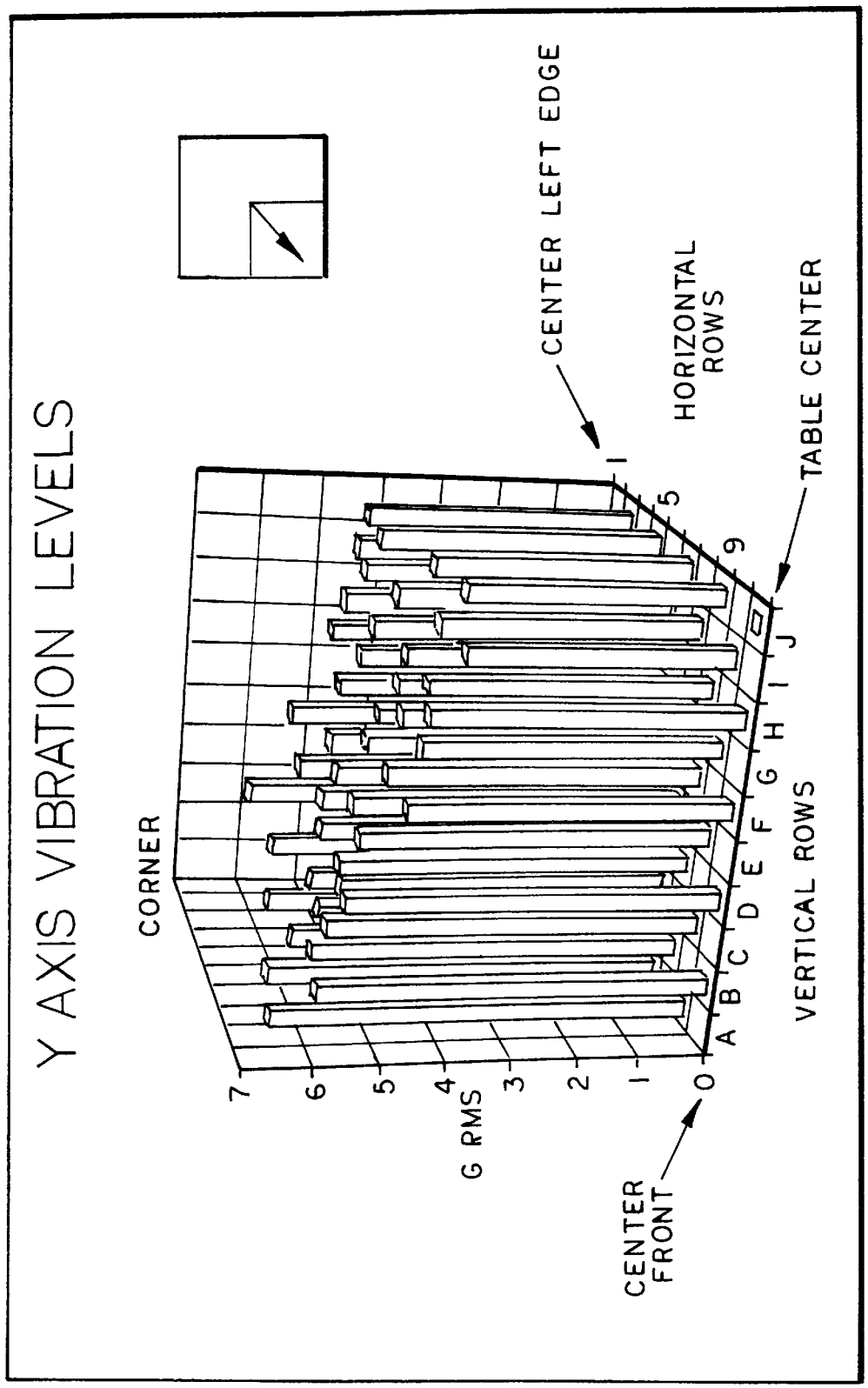
Figure 15:
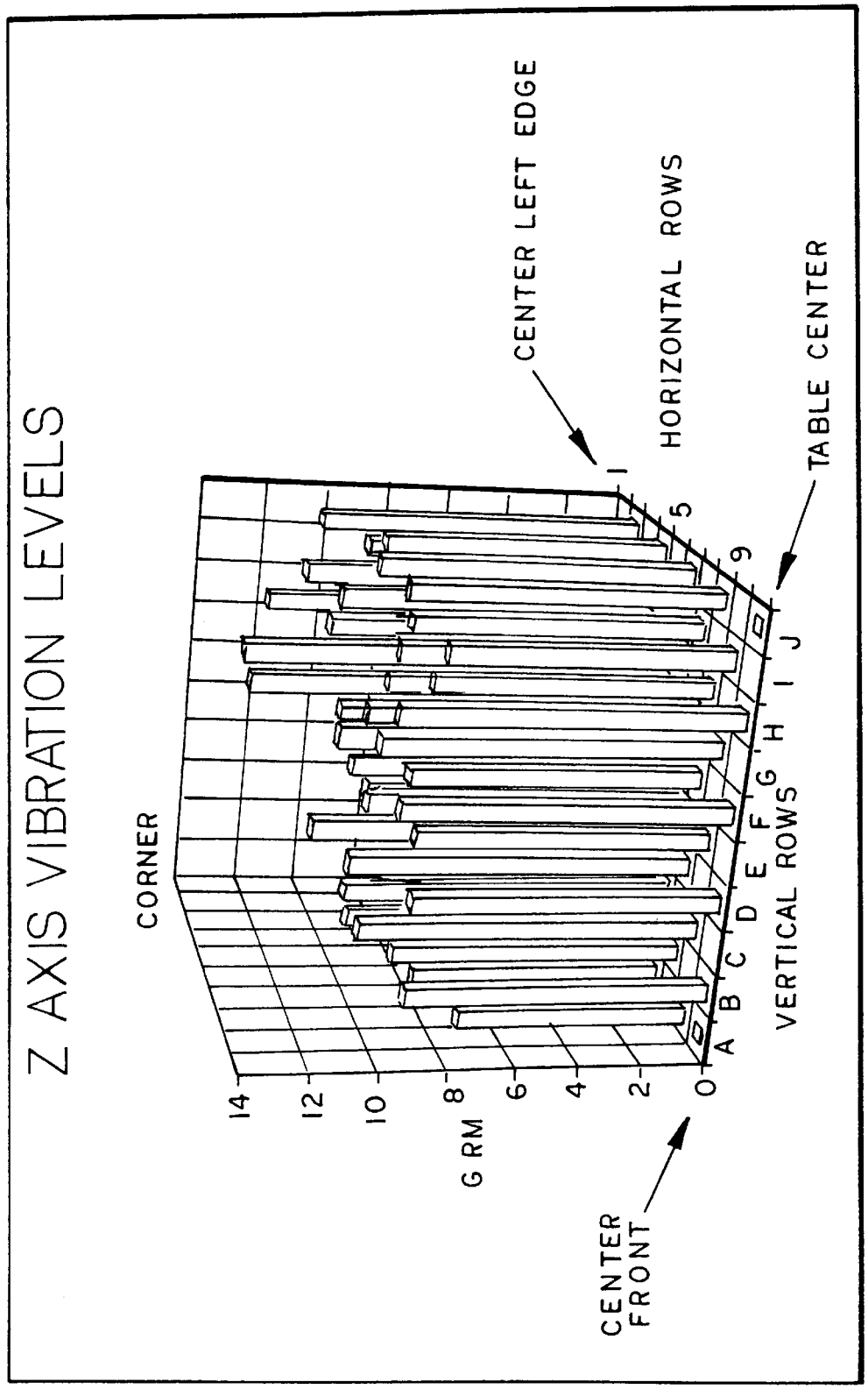
Figure 16:
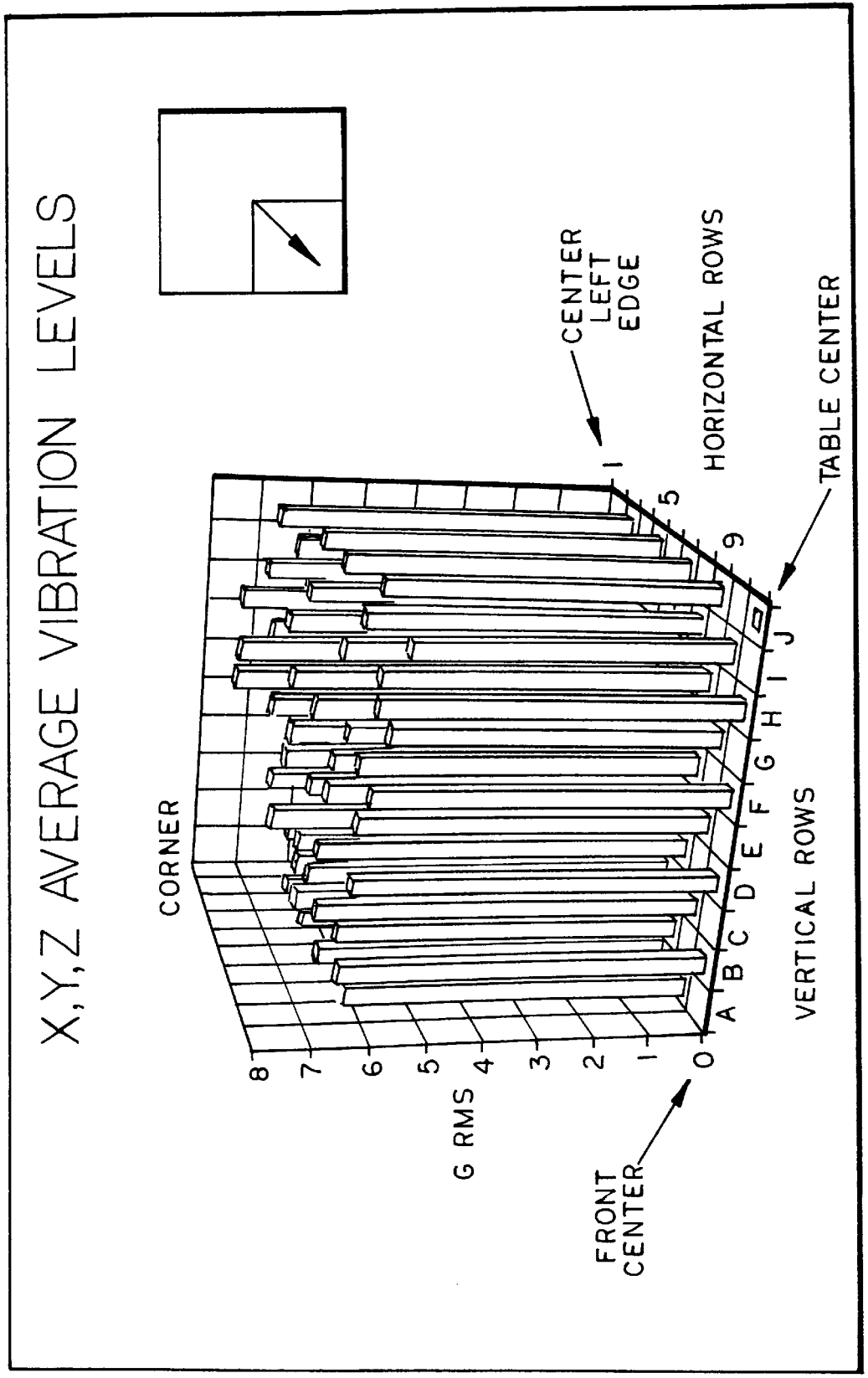
Figure 17:
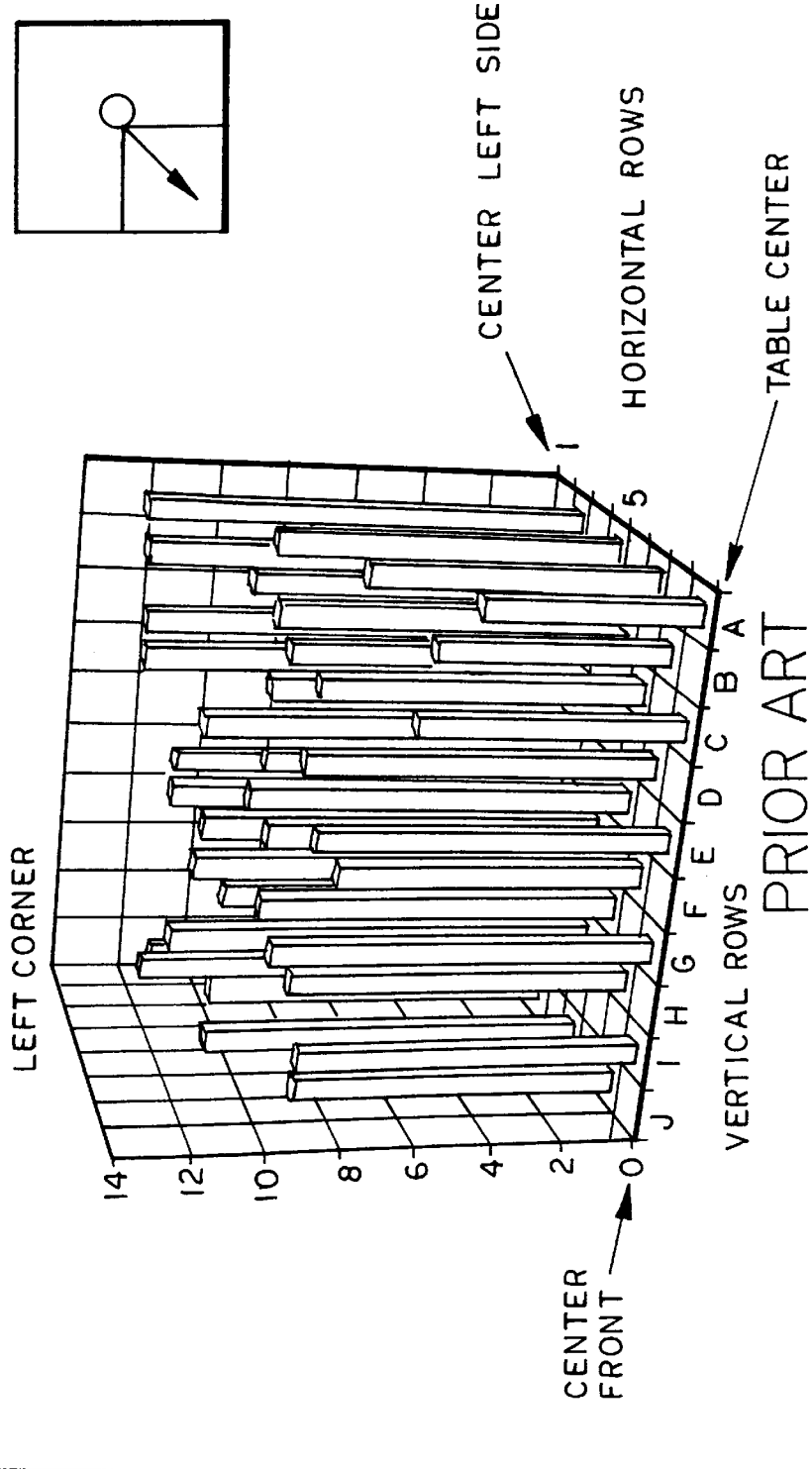
FIG. 17 illustrates vibration levels across the platform of a prior art vibration table.

FIGS. 13–16 illustrate the vibration levels along each of the axes of one quadrant of vibration table 10 and the average vibration levels of all three axes in the same quadrant. Referring to FIG. 13, the vibration levels along the x axis of the quadrant of the table vary from approximately 6.0 G-RMS (root mean square) to approximately 3.5 G-RMS with a standard deviation of approximately 0.61. With reference to FIG. 14, the vibration along the y axis is similarly substantially uniform over the quadrant of the table and vary from approximately 6.5 G-RMS to approximately 4.5 G-RMS, with a standard deviation equal to approximately 0.62. Referring to FIG. 15, the z axis vibration levels are, likewise, substantially uniform over the same quadrant table and vary from approximately 12 G-RMS to approximately 7.5, G-RMS with a standard deviation of 1.2. The data shown in FIGS. 13–15 establish that the vibration levels across platform 14 along any one axis are within a standard deviation of less than 2. In addition, the average vibration levels of all three axes has a standard deviation of 0.44 as shown in FIG. 16. Therefore, it can be seen from the vibration levels for each of the axes that the vibration across vibration table 10 is substantially uniform. Consequently, parts that are mounted to platform 14 are subjected to substantially uniform vibration levels regardless of where on platform 14 they are mounted.

Furthermore, while various forms of the invention have been shown and described, other forms are being apparent to those skilled in the art. Therefore, the embodiment of the invention shown in the drawings is not intended to limit the scope of the invention which is instead defined by the claims which follows.

Changes and modifications in the specifically described embodiments can be carried out without departing from the principles of the invention which is intended to be limited only by the scope of the appended claims, as interpreted according to the principles of patent law including the doctrine of equivalents.

The embodiments of the present invention in which I claim an exclusive privilege or property are defined as follows:

1. A vibration table comprising:
   a base;
   a platform supported by said base, said platform being movable independently of said base, said platform comprising a plate member having a first side and a second side, said first side for supporting articles to be vibrated by said vibration table, and said platform further including at least one projecting mounting surface extending outwardly from said second side; and a plurality of vibration assemblies for vibrating said platform, at least one of said vibration assemblies mounted to said at least one projecting mounting surface and at least another of said vibration assemblies mounted to said second side.

2. The vibration table according to claim 1, wherein said platform includes a plurality of mounting openings extending into said first side, said mounting openings for securing articles to said platform.

3. A vibration table according to claim 1, wherein a first group of said plurality of vibration assemblies is mounted on said projecting mounting surface of said platform and is angled with respect to said projecting mounting surface in a range of approximately 35° to 45°.

4. A vibration table according to claim 3, wherein said first group of vibration assemblies is angled with respect to said projecting mounting surface approximately 45°.

5. The vibration table according to claim 4, wherein a second group of said plurality of vibration assemblies is mounted to said at least one projecting mounting surface.

6. The vibration table according to claim 1, wherein said at least one projecting mounting surface comprises a generally vertical mounting surface, said vertical mounting surface being generally orthogonal to said second side of said platform.

7. The vibration table according to claim 1, said platform further including a plurality of projecting mounting surfaces, a group of said vibration assemblies being mounted to respective projecting mounting surfaces of said plurality of mounting surfaces and being approximately equidistant from a center of said platform.

8. The vibration table according to claim 7, further comprising a second group of said plurality of vibration assemblies being mounted to said respective projecting mounting surfaces and being spaced radially inwardly of said first group of vibration assemblies.

9. The vibration table according to claim 1, wherein said vibration assemblies induce vibration pulses, said vibration pulses in said platform induced by at least one group of said vibration assemblies are within a standard deviation of 2.

10. A vibration table comprising:

a base;

a platform supported by said base, said platform being movable independently of said base, said platform including a first side and a second side opposed and spaced from said first side, said first side for supporting articles to be vibrated by said vibration table, said platform further including at least one projecting mounting surface extending outwardly from said second side and at least one transverse member extending across and mounted to said second side of said platform, said transverse member including said projecting mounting surface; and a plurality of vibration assemblies for vibrating said platform, at least one of said vibration assemblies coupled to said at least one projecting mounting surface.

11. The vibration table according to claim 10, wherein said transverse member comprises a beam.

12. The vibration table according to claim 11, wherein said beam includes a rectangular cross-section.

13. A vibration table comprising:

a base;

a platform supported by said base, said platform being movable independently of said base, said platform including a first side and a second side opposed and spaced from said first side, said first side for supporting articles to be vibrated by said vibration table, said platform further including at least one projecting mounting surface extending outwardly from said second side and a reinforcing frame to stiffen said platform, said reinforcing frame including said at least one projecting mounting surface; and a plurality of vibration assemblies for vibrating said platform, at least one of said vibration assemblies coupled to said at least one projecting mounting surface.

14. The vibration table according to claim 13, wherein said frame includes a plurality of perimeter members and cross-members, said perimeter members being secured to said second side along a perimeter portion of said platform, and said cross-members extending diagonally across and mounted to said second side of said frame.

15. A vibration table comprising:

a base;

a plurality of springs;

a platform supported by said springs on said base, said platform including spaced apart first and second sides and a plurality of reinforcing members secured to said second side, said first side defining a mounting surface for mounting articles to said vibration table; and a plurality of vibration assemblies mounted to said reinforcing members whereby said reinforcing members distribute vibration from said at least one vibration assembly substantially uniformly across said platform.

16. The vibration table according to claim 15, wherein said platform includes a plate and a sheet of insulation, said plate having a plurality of mounting openings configured to receive fasteners, and said reinforcing members being mounted to said plate through said sheet of insulation.

17. The vibration table according to claim 15, wherein a group of said reinforcing members form a reinforcing frame.

18. A vibration table according to claim 17, wherein a first group of said plurality of vibration assemblies is mounted to said reinforcing frame.

19. A vibration table according to claim 18, wherein said first group of vibration assemblies is mounted to said reinforcing frame at an angle in a range of approximately 35° to 45°.

20. A vibration table according to claim 19, wherein said first group of vibration assemblies is mounted to said reinforcing frame at an angle of approximately 45°.

21. The vibration table according to claim 18, wherein a second group of said plurality of vibration assemblies is mounted to said reinforcing frame.

22. The vibration table according to claim 21, wherein said second group of vibration assemblies is mounted to said reinforcing frame equidistant from a center of said platform.

23. The vibration table according to claim 17, wherein said group of reinforcing members includes a plurality of beams, a first group of said beams being secured to said platform along a perimeter portion of said platform, and a second group of said beams extending diagonally across said second side of said platform and being interconnected to thereby stiffen said platform.

24. The vibration table according to claim 23, wherein a first group of said vibration assemblies is mounted to said first group of beams, and a second group of said vibration assemblies is mounted to said second group of beams.

25. The vibration table according to claim 15, wherein said vibration assemblies comprise pneumatic vibration assemblies.

26. A vibration table comprising:

a base;

a plurality of springs supported by said base;

a platform supported by said springs on said base, said platform comprising a plate, a sheet of insulation, and at least two reinforcing members, said plate having spaced apart first and second sides, said reinforcing members being secured to said second side of said plate through said sheet of insulation, said first side defining a mounting surface for mounting articles to said vibration table; and a plurality of vibration assemblies mounted to said platform, and at least a first group of said vibration assemblies being mounted to one of said reinforcing members and a second group of vibration assemblies being mounted to another of said reinforcing members whereby said reinforcing members distribute vibration from said vibration assemblies substantially uniformly across said platform.

27. The vibration table according to claim 26, wherein said reinforcing members comprise a plurality of beams, a first group of beams being secured to said platform along a perimeter portion of said platform, and a second group of said beams extending across said second side of said platform to thereby stiffen said platform.

28. The vibration table according to claim 27, wherein said second group of said beams extends diagonally across said second side of said platform.

29. The vibration table according to claim 27, wherein said beams have rectangular cross-sections.

30. The vibration table according to claim 27, said reinforcing members further comprising a mounting bracket, said first group of said vibration assemblies being mounted to said mounting bracket.

31. The vibration table according to claim 30, wherein said second group of vibration assemblies is mounted to said first group of beams, a third group of said vibration assemblies being mounted to said second group of beams radially inward of said second group of vibration assemblies.

32. The vibration table according to claim 27, wherein said reinforcing members include a mounting surface angled with respect to said second side of said platform.

33. The vibration table according to claim 32 wherein said mounting surface is substantially orthogonal to said second side of said platform.

34. A vibration table comprising:

a base;

a platform supported by said base, said platform being movable independently of said base, and said platform having a support surface for mounting articles to said vibration table and a plurality of mounting surfaces arranged in a plurality of planes; and a plurality of vibration assemblies for vibrating said platform, said vibration assemblies being mounted to said mounting surfaces in at least two of said planes whereby said vibration assemblies generate substantially uniform vibration pulses in said platform.

35. The vibration table according to claim 34, wherein said two planes are generally orthogonal planes.

36. The vibration table according to claim 34, wherein said platform includes at least one reinforcing member, said reinforcing member defining at least one of said mounting surfaces.

37. The vibration table according to claim 34, wherein said platform includes a reinforcing frame, said frame including said plurality of said mounting surfaces and including frame members being oriented in at least two planes.

38. The vibration table according to claim 34, wherein said platform includes a first side and a plurality of mounting openings extending into said first side, said mounting openings for securing articles to said platform on said support surface.

39. A vibration table according to claim 34, wherein said vibration assemblies are mounted to their respective mounting surfaces at an angle in a range of approximately 35° to 45°.

40. A vibration table according to claim 39, wherein said vibration assemblies are mounted to their respective mounting surfaces at an angle of approximately 45°.

41. A vibration table comprising:

a base;

a platform supported by said base, said platform being movable independently of said base, said platform including a support surface for supporting articles to be vibrated by said vibration table; and a plurality of vibration assemblies for vibrating said platform, said vibration assemblies being mounted to said platform and inducing four vibration vector forces in said platform at a plurality of locations on said platform, and said vibration vectors being balanced across said platform to produce substantially uniform vibration pulses in said platform across said platform.

42. The vibration table according to claim 41, wherein at least one group of said vibration pulses in said platform is within a standard deviation of 2.

43. The vibration table according to claim 42, wherein said vibration forces along any one axis of said platform are within a standard deviation of less than 1.5.

44. The vibration table according to claim 42, wherein said vibration forces along at least one axis of said platform are within a standard deviation of less than 1.0.

45. The vibration table according to claim 41, wherein said platform includes a plurality of mounting surfaces arranged in a plurality of planes, said vibration assemblies being mounted to at least two of said mounting surfaces, said at least two mounting surfaces being arranged in planes generally orthogonal to said support surface.

46. The vibration table according to claim 45, wherein said platform includes a reinforcing frame, said reinforcing frame providing at least one group of said mounting surfaces.

* * * * *